(12) United States Patent
Arandigoyen Martínez et al.

(10) Patent No.: US 11,548,040 B2
(45) Date of Patent: Jan. 10, 2023

(54) MEANS FOR PREVENTING THE CLOGGING OF A PLATE CONDENSER OF A DOMESTIC DISHWASHER

(71) Applicant: BSH Hausgeräte GmbH, Munich (DE)

(72) Inventors: Naiara Arandigoyen Martínez, Pamplona (ES); Sergio Casado Carlino, Sarriguren (ES); Esther Castillo Bergad, Saragossa (ES); Eloy Merino Alcaide, Sarriguren (ES); Gustavo Moliner Murillo, Estella (ES); Jose Maria Sadaba Chalezquer, Pamplona (ES); Xabier Sagües García, Pamplona (ES); Koldo Urdiain Yoldi, Ayegui (ES); Ciro Sebastián Vereda Ortiz, Pamplona (ES)

(73) Assignee: BSH Hausgeräte GmbH, Munich (DE)

( * ) Notice: Subject to any disclaimer, the term of this patent is extended or adjusted under 35 U.S.C. 154(b) by 210 days.

(21) Appl. No.: 16/636,652

(22) PCT Filed: Aug. 31, 2018

(86) PCT No.: PCT/IB2018/056671
§ 371 (c)(1),
(2) Date: Feb. 5, 2020

(87) PCT Pub. No.: WO2019/049007
PCT Pub. Date: Mar. 14, 2019

(65) Prior Publication Data
US 2021/0146407 A1    May 20, 2021

(30) Foreign Application Priority Data
Sep. 8, 2017   (ES) .................. P201731098

(51) Int. Cl.
*B08B 3/04* (2006.01)
*A47L 15/42* (2006.01)

(52) U.S. Cl.
CPC ............ *B08B 3/04* (2013.01); *A47L 15/4202* (2013.01); *A47L 15/4285* (2013.01);
(Continued)

(58) Field of Classification Search
CPC .... B08B 3/04; A47L 15/4202; A47L 15/4285; A47L 15/4291; A47L 2501/04;
(Continued)

(56) References Cited

U.S. PATENT DOCUMENTS

| 5,299,633 A | 4/1994 | Brueggemann et al. |
| 6,058,974 A | 5/2000 | Blomgren |

(Continued)

FOREIGN PATENT DOCUMENTS

| CH | 699692 A2 * | 3/2010 | ......... A47L 15/4291 |
| CN | 202420010 U * | 9/2012 | |

(Continued)

OTHER PUBLICATIONS

NPL-1 (Publication) Tahseen Ahmad Tahseen et al., An overview on thermal and fluid flow characteristics in a plain plate finned and un-finned tube banks heat exchanger, Elsevier : Renewable and Sustainable Energy Reviews 43 (2015) 363-380 (Year: 2015).*
National Search Report ES 201731098 dated Mar. 16, 2018.
International Search Report PCT/IB2018/056671 dated Feb. 20, 2019.

*Primary Examiner* — Michael E Barr
*Assistant Examiner* — Pallavi Chitta
(74) *Attorney, Agent, or Firm* — Michael E. Tschupp; Andre Pallapies; Brandon G. Braun (57) ABSTRACT

A household dishwasher includes a receiving compartment for receiving an item to be washed, a pump sump, and a heat pump assembly through which, during operation, a heat transfer medium flows. The heat pump assembly includes a
(Continued)

plate condenser configured to enable a transfer of heat from the heat transfer medium to a washing liquor circulating in the household dishwasher. A spray assembly supplies washing liquor to the item to be washed. A first flow path extends from the pump sump to the spray assembly for conducting the washing liquor, and a second flow path extends from the pump sump to the plate condenser. Means are provided to prevent or hinder foreign matter that is swept along with the washing liquor from adhering to a washing-liquor-facing surface of the plate condenser, or to detach foreign matter adhering to the washing-liquor-facing surface from said surface.

13 Claims, 4 Drawing Sheets

(52) U.S. Cl.
CPC ....... *A47L 15/4291* (2013.01); *A47L 2501/04* (2013.01); *A47L 2501/06* (2013.01); *A47L 2601/02* (2013.01)

(58) Field of Classification Search
CPC ............. A47L 2501/06; A47L 2601/02; A47L 15/0057; Y02B 30/52; F25B 2339/043
See application file for complete search history.

(56) References Cited

U.S. PATENT DOCUMENTS

| | | | |
|---|---|---|---|
| 2009/0250085 A1 | 10/2009 | Gaus et al. | |
| 2013/0192642 A1* | 8/2013 | Beshears, Jr. | ......... A47L 15/424 134/18 |
| 2014/0060590 A1 | 3/2014 | Aras et al. | |
| 2014/0373876 A1* | 12/2014 | Feddema | ............ A47L 15/4202 134/10 |
| 2015/0013178 A1* | 1/2015 | Stolze | ................... F28D 20/023 34/282 |
| 2017/0028447 A1 | 2/2017 | Cagnasso et al. | |

FOREIGN PATENT DOCUMENTS

| | | | |
|---|---|---|---|
| CN | 206803552 U | * 12/2017 | |
| DE | 19505641 A1 | 8/1996 | |
| DE | 102013114273 A1 | 7/2015 | |
| DE | 102014219457 A1 | 3/2016 | |
| EP | 1334851 A2 | * 8/2003 | ......... B60H 1/00907 |
| EP | 2449945 A2 | * 5/2012 | ......... A47L 15/4202 |
| EP | 2449945 A2 | 5/2012 | |
| EP | 2682039 A1 | 1/2014 | |
| GB | 2551014 A | * 12/2017 | ............. B01D 53/30 |
| WO | 2007146656 A1 | 12/2007 | |

* cited by examiner

MEANS FOR PREVENTING THE CLOGGING OF A PLATE CONDENSER OF A DOMESTIC DISHWASHER

CROSS-REFERENCES TO RELATED APPLICATIONS

This application is the U.S. National Stage of International Application No. PCT/IB2018/056671, filed Aug. 31, 2018, which designated the United States and has been published as International Publication No. WO 2019/049007 A1 and which claims the priority of Spanish Patent Application, Serial No. P201731098, filed Sep. 8, 2017, pursuant to 35 U.S.C. 119(a)-(d).

BACKGROUND OF THE INVENTION

The invention relates to a household dishwasher having a receiving compartment for receiving items to be washed, a pump sump, a heat pump assembly through which, during operation, a heat transfer medium flows, wherein the heat pump assembly comprises inter alia a condenser in the form of a plate condenser which is used to transfer heat from the heat transfer medium to a washing liquor circulating in the household dishwasher, and at least one spray assembly which can be used to supply the items to be washed with washing liquor, wherein the household dishwasher has a first flow path for the washing liquor, said path extending from the pump sump to the spray assembly, and wherein the household dishwasher has in particular a second flow path extending from the pump sump to the plate condenser.

Also described is a method for operating a household dishwasher having a receiving compartment for receiving items to be washed, a pump sump and a heat pump assembly through which, during operation, a heat transfer medium flows, wherein the heat pump assembly comprises inter alia a condenser in the form of a plate condenser which is used, during operation of the heat pump assembly, to transfer heat from the heat transfer medium to a washing liquor circulating in the household dishwasher, and at least one spray assembly which is used to supply the items to be washed with washing liquor during a washing program.

Household dishwashers are known in the prior art and serve in principle to clean and then dry soiled items to be washed, such as dishes or cutlery. During one or more cleaning steps of a washing program, washing liquor or washing fluid (in particular water or water with detergent and/or rinse aid) is supplied to the items to be washed in order to detach foreign matter from the items to be washed. For drying the items to be washed, corresponding household dishwashers have a drying system for the cleaned items to be washed, in which air takes up the water adhering to the cleaned items to be washed and thereby dries the items to be washed. The moist air is then conducted to the outside or guided past a cold surface in order to condense water vapor.

The household dishwasher according to the present invention further has a heat pump assembly as described below. The heat pump assembly comprises in principle a heat exchanger acting as an evaporator for evaporating a heat transfer medium and a compressor for compressing the evaporated heat transfer medium. With the aid of the compressor, the gaseous heat transfer medium introduced into the compressor during operation of the heat pump assembly is compressed, wherein it is heated.

The heat pump assembly further comprises a heat exchanger acting as a condenser, in which the gaseous heat transfer medium which has been heated is condensed again and in the process gives off heat, which can be used for example to heat the washing liquor or washing fluid present in the household dishwasher. The condensed heat transfer medium is then depressurized with the aid of an expansion element (usually a thrush valve or a capillary tube) and finally returns to the evaporator, where by absorbing heat it transitions once again to the gaseous state in order then to be guided once again to the compressor.

The heat exchanger acting as an evaporator can be present for example as a pipe coil or also as a heat exchanger embodied to be flat (known as a plate heat exchanger). In each case, an inlet and an outlet for the heat transfer medium are present. The latter also applies to the heat exchanger acting as an evaporator, wherein this is embodied as a plate heat exchanger in accordance with the present invention, in the following as a plate condenser.

Plate condensers generally comprise several in particular largely flat or embossed plates made from metal or a thermally conductive plastic, arranged in parallel with one another. The plates are each connected to one another via connecting portions and thus form flow channels or a cavity for the washing liquor and the heat transfer medium, wherein both media are guided separately from one other through the plates. The heat exchange between the media finally takes place by means of heat conduction via the individual plates. Preferably a cavity between a first plate and an adjacent second plate arranged at a distance therefrom, which cavity is provided for the flow-through of washing liquor to be heated, alternates with a cavity between the second plate and a third plate arranged at a distance therefrom, which cavity is provided for the flow-through of the heat transfer medium. The plates can preferably be stacked in a straight line one behind the other or one above the other. Alternatively, the plates of a plate condenser which are stacked one above the other or one behind the other can be arranged in a spiral shape, in particular wound, so that a spiral condenser is provided.

The heat exchanger which serves as a condenser therefore has a washing liquor inlet and a washing liquor outlet, so that the washing liquor to be heated can be guided across the surfaces of the plate condenser that face the washing liquor.

A problem in the known plate condensers is that the washing liquor generally carries with it foreign matter originating from the items to be washed. This foreign matter can adhere to the said surfaces of the plate condenser or to the said connecting portions. This results in a reduced heat transfer between washing liquor and heat transfer medium, so that the degree of efficiency of the plate condenser and thus of the heat pump assembly is reduced.

BRIEF SUMMARY OF THE INVENTION

The object of the present invention is to develop a household dishwasher with a heat pump assembly and a method for operating the same.

The object is achieved by a household dishwasher and a method having the features of the independent claims.

According to the invention, it is provided that the household dishwasher has at least one means which is embodied to prevent or hinder foreign matter that is swept along with the washing liquor from adhering to a surface of the plate condenser facing the washing liquor, and/or to detach foreign matter adhering to the surface from said surface.

According to the invention, it is therefore ensured that the surfaces of the plate condenser which face the washing liquor are soiled only minimally or not at all with the foreign matter from the washing liquor, wherein such foreign matter also includes fats which are swept along in the washing liquor. The surfaces therefore always have an unsoiled surface or a surface which is freed regularly of adhering foreign matter by way of said means.

According to one advantageous embodiment, the means is embodied as the conveying means, preferably as a pump, which conveys the washing liquor, with the aid of which the flow speed of the washing liquor or washing fluid flowing through the plate condenser can be temporarily increased or reduced.

It is therefore conceivable that the washing liquor, during the longest period of operation of the heat pump assembly, is conveyed by the conveying means through the plate condenser with a volume flow that lies between defined limits. Furthermore, periods of time are provided during which the flow speed and thus the volume flow is increased or reduced with respect to these limits. This results in changes of flow within the plate condenser, which cause the foreign matter adhering to the interior of the plate condenser to become detached. Said detachment can be achieved on the one hand by a particularly high flow speed, as adhering foreign matter can hereby be swept away. On the other hand, a reduced flow speed can also be helpful if the flow characteristic within the plate condenser is thereby changed in such a way that foreign matter adhering to the connecting portions, such as elongated items of foreign matter (hairs, noodles, etc.) are moved in a different direction and thereby become detached.

It is also advantageous if the conveying means is designed to change, preferably reverse the flow direction of the washing liquor flowing through the plate condenser. The washing liquor therefore preferably flows, during one part of the operation of the heat pump assembly, in a first direction through the plate condenser (washing liquor inlet→washing liquor outlet). Likewise, there are temporal sections during the operation of the heat pump assembly during which the washing liquor flows via what is actually the washing liquor outlet into the plate condenser and, from there, back out of the plate condenser via what is actually the washing liquor inlet. In this manner, in particular tangled strands of foreign matter within the plate condenser can be removed easily from the plate condenser.

The conveying means can be operated in a pulsed manner, creating turbulences within the plate condenser which cause foreign matter to become detached. In addition, the flow direction of the washing liquor can be changed several times per minute or several times per ten seconds in order to generate a particularly strong turbulence.

According to one advantageous development, the conveying means is integrated into the second flow path. It can for example also be provided that the first flow path of the washing liquor, which extends from the pump sump to the spray assembly, is assigned a first conveying device, by way of which washing liquor can be conveyed along the first flow path, and that the second flow path, which extends from the pump sump to the plate condenser, is assigned the abovementioned conveying means, by way of which the washing liquor can be conveyed along the second flow path and through the plate condenser.

The first flow path and the second flow path are preferably fluid paths which are separated from one another.

The respective flow path is in each case preferably formed by one or several line sections (e.g. pipes) or channel sections.

The spray assembly preferably comprises one or several rotating spray arms, as are known from the prior art. The spray assembly can also comprise a washing liquor distributor in the region of the ceiling wall of the household dishwasher.

The said pump sump is a depression in the base wall delimiting the receiving compartment toward the bottom, in which the washing liquor collects again and again in order to be pumped by the conveying device and/or the conveying means in the direction of the spray assembly and/or of the condenser or in order to exit the household dishwasher via a drain.

The conveying device and the conveying means are preferably in each case a fluid pump, the rotational speed and conveying power of which can preferably be adjusted, in particular regulated (for example using a control and/or regulating unit of the household dishwasher).

According to an advantageous development, the means according to the invention is embodied as a bypass, which enables the flow path of the washing liquor flowing into the plate condenser to be changed. It would for example be conceivable that a first washing liquor line leads from the pump sump to the plate condenser, through which the washing liquor flows via a washing liquor inlet into the plate condenser. From there, a second washing liquor line leads from a washing liquor outlet of the plate condenser back to the pump sump or to an outlet for the washing liquor in the region of one of the side walls of the dishwasher cavity of the household dishwasher. Furthermore, a bypass can be present in the form of a third washing liquor line, via which the washing liquor can flow, starting from the pump sump, into the plate condenser via the above washing liquor outlet and out of the plate condenser via the abovementioned washing liquor inlet. One or several valves are preferably associated with the bypass, via which it is possible to determine whether the washing liquor is flowing via the washing liquor inlet or the washing liquor outlet into the plate condenser. This enables the flow direction of the washing liquor within the plate condenser to be changed, so that an adherence of foreign matter within the plate condenser can be hindered or prevented and adhering foreign matter can be detached.

According to a further advantageous development, the means is embodied as a heating device, with the aid of which the washing liquor flowing into the plate condenser can be heated before entering the plate condenser or within the plate condenser to a minimum temperature of at least 60° C. As a result, the washing liquor has a temperature that hinders or prevents an adhesion of fats within the plate condenser or that is sufficient to detach fats from the washing liquor which have already adhered. Here, the temperature can be increased once or several times during selected sections of the respective washing program. During the rest of the time period, a temperature that exercises the desired cleaning effect on the items to be washed located within the receiving compartment is sufficient. The heating device is therefore designed in particular to heat the washing liquor to different temperatures.

According to a further advantageous development, the heating device is embodied as an electrical heater. The heater can be assigned to a washing liquor line extending from the pump sump to the plate condenser, so that the washing liquor is heated on its way into the plate condenser. The heater could for example surround the said washing liquor line in a certain region or otherwise be in thermally conductive contact therewith. It is also conceivable that the heater wholly or partially surrounds the plate condenser or is in thermally conductive contact therewith. In this case, the plates of the plate condenser and thus also the washing liquor flowing therein would be heated. It is also conceivable that the conveying means conveying the washing liquor through the plate condenser is operated more slowly or not at all during the operation of the heater so that the washing liquor can be heated sufficiently even at a low heating power of the heater.

According to one advantageous development, the heating device is formed by the plate condenser itself. In other words, it is therefore possible to operate the heat pump assembly during selected sections of a washing program in such a way that the plate condenser gives off a heat to the washing liquor which is sufficient to heat the latter to the abovementioned minimum temperature.

According to a further advantageous development, the means is embodied as a filter assembly. This filter assembly is provided upstream of the plate condenser viewed in the flow direction. The filter assembly is provided upstream of the plate condenser in the flow path, preferably integrated or inserted into the washing liquor line, and prevents foreign matter above a certain size from entering the plate condenser. The filter assembly can preferably be removed easily by the operator of the household dishwasher and can thus be cleaned unproblematically. It can preferably be removed without the use of a tool.

The filter assembly can be fastened in the household dishwasher by means of an easily movable thread or a clip or snap connector, for example.

According to a further advantageous development, the filter assembly is integrated into the second flow path extending from the pump sump to the plate condenser. It is generally advantageous if a coarse filter and/or a fine filter is arranged in the region of the pump sump to trap foreign matter before the washing liquor flows from the pump sump via the first flow path to the spray assembly and/or via the second flow path to the plate condenser. It is particularly advantageous if, in addition thereto or independently thereof, a filter is provided in the form of the said filter assembly, which is integrated into the said second flow path. In other words, this filter assembly therefore serves exclusively to filter the washing liquor being conveyed from the pump sump to the plate condenser, while the washing liquor being conveyed directly from the pump sump to the spray assembly does not flow through the said filter assembly.

Alternatively, the filter assembly can already be provided at the inlet of the second flow path. Expressed in general terms, it can be expedient if the second flow path has a separate filter assembly upstream of the plate condenser viewed in the flow direction (in particular forced by its assigned conveying means) and/or at the inlet of the plate condenser before the washing fluid flows into the one or several cavities of the plate condenser.

According to a further advantageous development, the filter assembly has a mesh size of between 2 mm and 8 mm, preferably between 4 mm and 6 mm. The said values ensure that the filter assembly does not become clogged too quickly with foreign matter and nevertheless a large proportion of the foreign matter is trapped by the filter assembly and does not therefore enter the plate condenser.

The mesh size can generally also be selected as a function of the geometry of the plate condenser. It is particularly advantageous if the mesh size of the filter assembly is smaller than the smallest distance between two opposing sides of the surface of the plate condenser facing the washing liquor, in other words than the cross-section width of the respective fluid flow-through channel or cavity between each two plates of the plate condenser arranged at a distance from one another through which washing liquor to be heated is to be conveyed. This prevents foreign matter from becoming stuck between the said plates and thus adhering thereto.

The method according to the invention is characterized in that, with the aid of at least one means of the household dishwasher, foreign matter that is swept along with the washing liquor is hindered or prevented from adhering to a surface of the plate condenser facing the washing liquor, and/or foreign matter adhering to the surface is detached from said surface.

The means can be embodied to change the flow direction of the washing liquor within the plate condenser, for example by changing the flow speed or the flow direction. The washing liquor can also be heated before or after entering the plate condenser. It is also conceivable that the means causes foreign matter to be filtered out of the washing liquor before it enters the plate condenser.

Several means can of course also be present, which achieve the object of the invention jointly. It would be conceivable, for example, to heat the washing liquor by means of a heating device and, simultaneously or at different times, also to reverse the flow direction of the washing liquor in the region of the plate condenser and/or to filter the washing liquor before it enters the plate condenser.

The means is embodied in particular according to the previous or following description.

The household dishwasher preferably has one or several of the features described above or in the following. Moreover, the household dishwasher preferably has a control and/or regulating unit, which is embodied to operate the household dishwasher according to one or several of the method features described.

According to one advantageous development, the washing liquor being conveyed from the pump sump to the plate condenser flows through a filter assembly, which serves to remove foreign matter up to a defined particle size from the washing liquor before it flows into the plate condenser. The washing liquor is hereby freed of foreign matter larger than the mesh size of the filter device. The filter device can be a filter device capable of being replaced without tools. The use of a self-cleaning filter device is also conceivable. It would for example be conceivable that the flow of washing liquor flowing through the filter device is temporarily reversed or changed, so that the filter device is freed of adhering foreign matter in the reverse flow.

According to one advantageous development, the washing liquor is heated to a temperature of at least 60° C. before entering the plate condenser and/or within the plate condenser at least during selected program steps of a washing program. As a result, in particular fatty deposits within the plate condenser become detached, so that the surfaces thereof facing the washing liquor are once again free of corresponding deposits. If the washing liquor is heated at least once per washing program to the said temperature, it is possible to prevent or at least hinder the adherence of foreign matter from the outset.

It is particularly advantageous if the heating of the washing liquor takes place during a rinsing step, during which a rinse aid is supplied to the washing liquor. Such a step is timed to take place after the main cleaning step, during which the foreign matter is removed from the items to be washed. The heating therefore preferably takes place when no new foreign matter is introduced into the washing liquor from the items to be washed.

According to one advantageous development, the flow direction of the washing liquor flowing through the plate condenser is at least temporarily changed, preferably reversed. For example, the flow direction of the washing liquor flowing through the plate condenser could be reversed once or several times during a washing program by the conveying direction of the conveying device conveying the washing liquor into the plate condenser being reversed for a certain period of time. It is also conceivable to change the conveying power of the conveying device, causing the washing liquor to flow at different flow speeds through the plate condenser.

A means for preventing or reducing the clogging of the plate condenser with foreign bodies or foreign matter can be provided in addition to or independently of the aforegoing variants in particular by the distance or width of the gap between two adjacent walls of the plate condenser in each case, between which a flow channel for the flow-through of washing liquor or washing liquid to be heated is present during operation of the heat pump assembly, being selected to be at least equal to 4.5 mm. In general terms, this gap width for the flow-through of washing liquor between two adjacent plates of the condenser in each case is selected to be approximately equal to or preferably greater than the smallest occurring cross-section width of a pump, in particular circulating pump, arranged in the flow-through channel, which cross-section still permits a sufficient passage of foreign bodies.

The same dimensioning also applies in particular to the transverse distance between two adjacent connecting points in each case, which are provided between two adjacent walls of the plate condenser in each case in order to hold said walls together (transversely, in particular perpendicularly to the respective plate or wall plane), between which walls a flow channel is present for the flow-through of washing liquor to be heated during operation of the heat pump assembly.

The advantageous embodiments and/or developments of the invention described above and/or the other advantageous embodiments and/or developments of the invention described in the dependent claims can be applied individually or in any combination, except, for instance, in cases where dependencies are explicit or alternatives cannot be combined.

The invention and advantageous embodiments and developments thereof are described below in greater detail with reference to drawings.

BRIEF DESCRIPTION OF THE DRAWINGS

These are schematic principle sketches in which.

DETAILED DESCRIPTION OF EXEMPLARY EMBODIMENTS OF THE PRESENT INVENTION

In the following figures, corresponding parts are provided with the same reference characters. Only those elements of a household dishwasher 1 are described and provided with reference characters that are necessary to the understanding of the invention. Of course the household dishwasher 1 according to the invention can comprise further parts and assemblies.

The household dishwasher 1 according to the invention comprises several walls 16 (in the form of side walls, one rear wall, one ceiling wall and one base wall), which delimit an internal receiving compartment 2, which serves to receive items to be washed 3. The sections shown are of course surrounded by a housing with a door (not shown).

To receive the items to be washed 3, the receiving compartment 2 contains for example one or several racks 21. One or several spray assemblies 7 are also present, which can be used to supply a washing liquor 6, in other words water or water with detergent and/or rinse aid, to the items to be washed 3, for example during a cleaning or rinsing step of a washing program. In the example shown, the spray assembly 7 comprises a section assigned to the upper rack 21 and a section assigned to the lower rack 21. It can have in particular an upper rotatably mounted spray arm and a lower rotatably mounted spray arm.

For freshwater supply purposes, the household dishwasher 1 is connected via a water supply (not shown) to a freshwater network (also not shown). A drain 17 is also present, via which the household dishwasher 1 is connected to a wastewater network (not shown) and via which dirty washing liquor 6 can be conveyed out of a pump sump 4 of the household dishwasher 1 arranged in the region of the base wall.

Before the washing liquor 6 is removed via the drain 17, however, it is generally circulated several times and supplied via the spray assembly 7 to the items to be washed 3 in order to detach foreign matter 22. For this purpose, the household dishwasher 1 comprises a first flow path 8 extending from the pump sump 4 to the spray assembly 7 or the sections thereof specified above.

The first flow path 8 preferably comprises one or several line sections 12, for example in the form of pipes. A flow divider gate (not shown) can be arranged between a conveying device 10 and the said sections of the spray assembly 7, via which the volume flow of the washing liquor 6 to the individual sections of the spray assembly 7 is determined or, in the case of an active flow divider gate, can be regulated by way of a control and/or regulating unit (not shown).

The first flow path 8 preferably begins in the region of a first inlet 13 in the pump sump 4 and extends to the washing liquor outlet openings of the spray assembly 7. It comprises the said conveying device 10 for the washing liquor 6.

Also provided is a second flow path 9 with an inlet 14 in the pump sump 4 and an outlet 15 in the pump sump 4 (as shown) or in the region of a wall 16 delimiting the receiving compartment 2 (not shown). It has a conveying means 23 for the washing liquor 6.

The conveying device 11 and the conveying means 23 are preferably a fluid pump, the conveying power of which can be adjusted using the control and/or regulating unit.

In order to heat the washing liquor 6, the household dishwasher 1 comprises a heat pump assembly with an evaporator, a compressor, an expansion element and a condenser in the form of a plate condenser 5, wherein the three components first mentioned are not shown. These can therefore be arranged at any location. The evaporator can preferably be arranged in the region of an outer side of the said walls 16. During the one or several program sub-steps with washing fluid to be heated, for example during the cleaning or rinsing step of a dishwashing program to be carried out, it can in particular be arranged such that it is thermally isolated from the receiving compartment, for example by means of at least one thermal insulation layer, in order that heat losses from the receiving compartment during the one or several program sub-steps with washing liquor to be heated, for example during the cleaning or rinsing step, are to a large extent avoided. The thermal insulation is advantageously embodied or deactivatable in such a way that, during the drying step of the dishwashing program to be carried out, a heat transfer from the receiving compartment to the heat transfer medium is enabled when the latter passes through the evaporator. This is particularly advantageous during the drying step, since water vapor in the receiving compartment 2 is to condense in this step. The evaporator is preferably a plate condenser.

Figure 3:
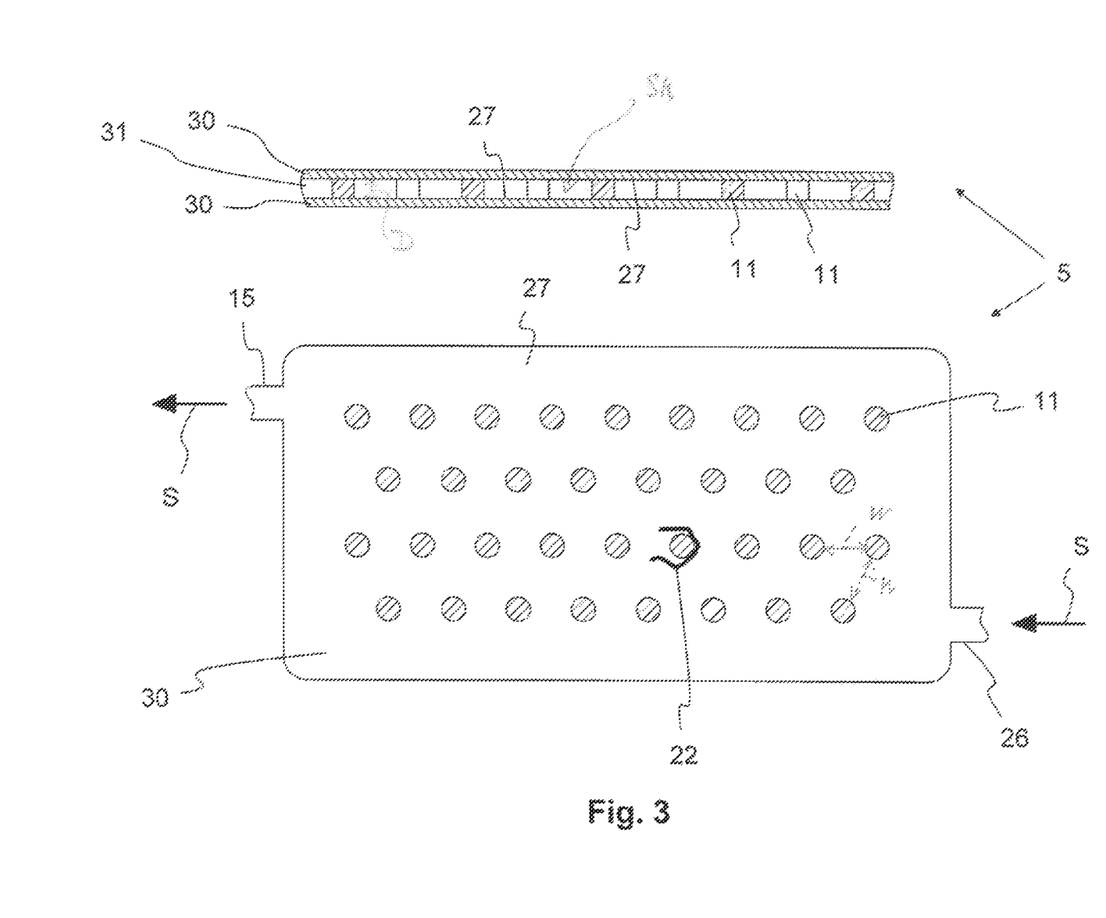
FIG. 3 shows a longitudinal section through two plates of a plate condenser (top) and a top view of a surface of a plate of a plate condenser facing the washing liquor (bottom), along which washing liquor flows in a predetermined flow direction in order to be heated.
Figure 4:
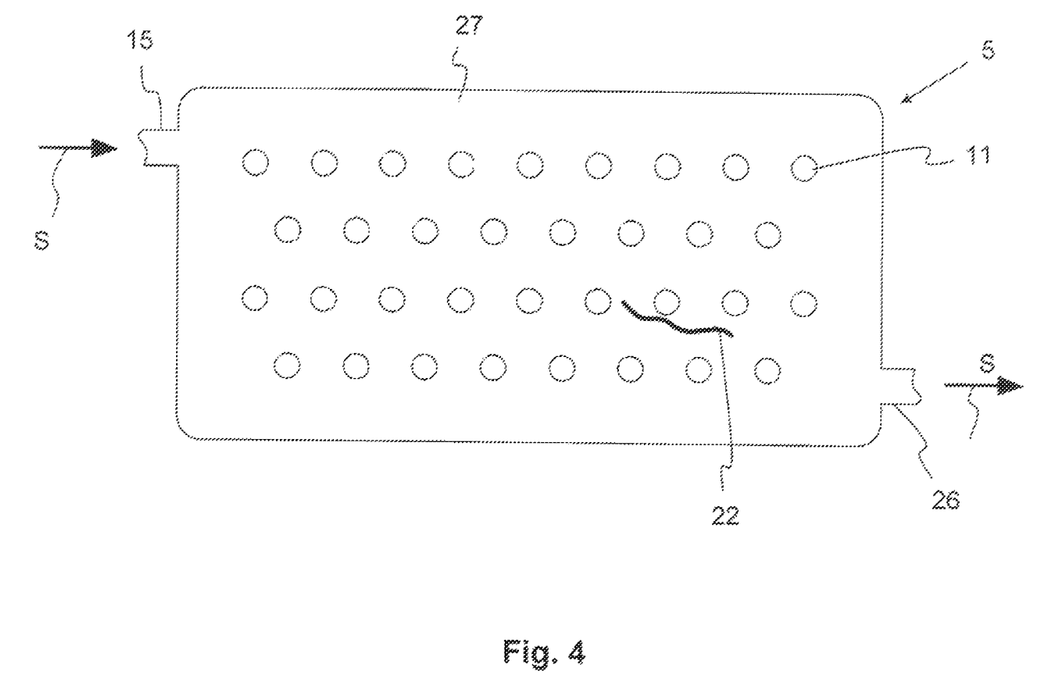
FIG. 4 shows a top view of the surface of the plate facing the washing liquor from FIG. 3, along which the washing liquor flows in the opposite direction to FIG. 3 during a phase for the elimination of foreign matter.

If the compressor is now activated, the heat transfer medium present in gaseous form in the region of the compressor is compressed. The compressed heat transfer medium flows onward to the plate condenser 5, where it gives off heat and in the process condenses. The liquid heat transfer medium then reaches the expansion element, which effects a reduction in pressure. Subsequently, the heat transfer medium, still wholly or partially in liquid form, flows to the evaporator. There it extracts heat from the environment and/or a water tank, in particular freshwater infeed tank (not shown in the drawing for this exemplary embodiment) and is hereby transformed into the gaseous aggregate state in order to return ultimately to the compressor, so that the heat transfer medium cycle is closed. The plate condenser 5 comprises on the inlet side a washing liquor inlet 26 for the washing liquid or washing liquor to be heated which is fed in from the pump sump 4 and on the outlet side a washing liquor outlet 15 for feeding the washing liquid heated in the plate condenser 5 back into the pump sump 4 and/or to another location in the receiving compartment 2. Here, the plate condenser 5 is connected via a first heat transfer medium line 18 to the compressor and via a second heat transfer medium line 19 to the expansion element of the heat pump assembly. The first heat transfer medium line 18 feeds the heat transfer medium into at least one flow-through channel of at least one plate of the plate condenser. After passing through the multiplicity of flow-through channels of the plates of the plate condenser, the heat transfer medium leaves the latter via the second heat transfer medium line 19. Washing liquor inlet 26 and washing liquor outlet 15 of the plate condenser 5 are indicated in FIGS. 3 and 4.

In the example shown, the plate condenser 5 is arranged below the base wall. It can of course also be positioned in the region of the ceiling wall or one of the side walls.

In order to transport the washing liquor 6 to the plate condenser 5, the household dishwasher 1 comprises the second flow path 9 for the washing liquor 6, which extends from a second inlet 14 in the pump sump 4 to the plate condenser 5 and from there to an outlet 28.

Figure 1:
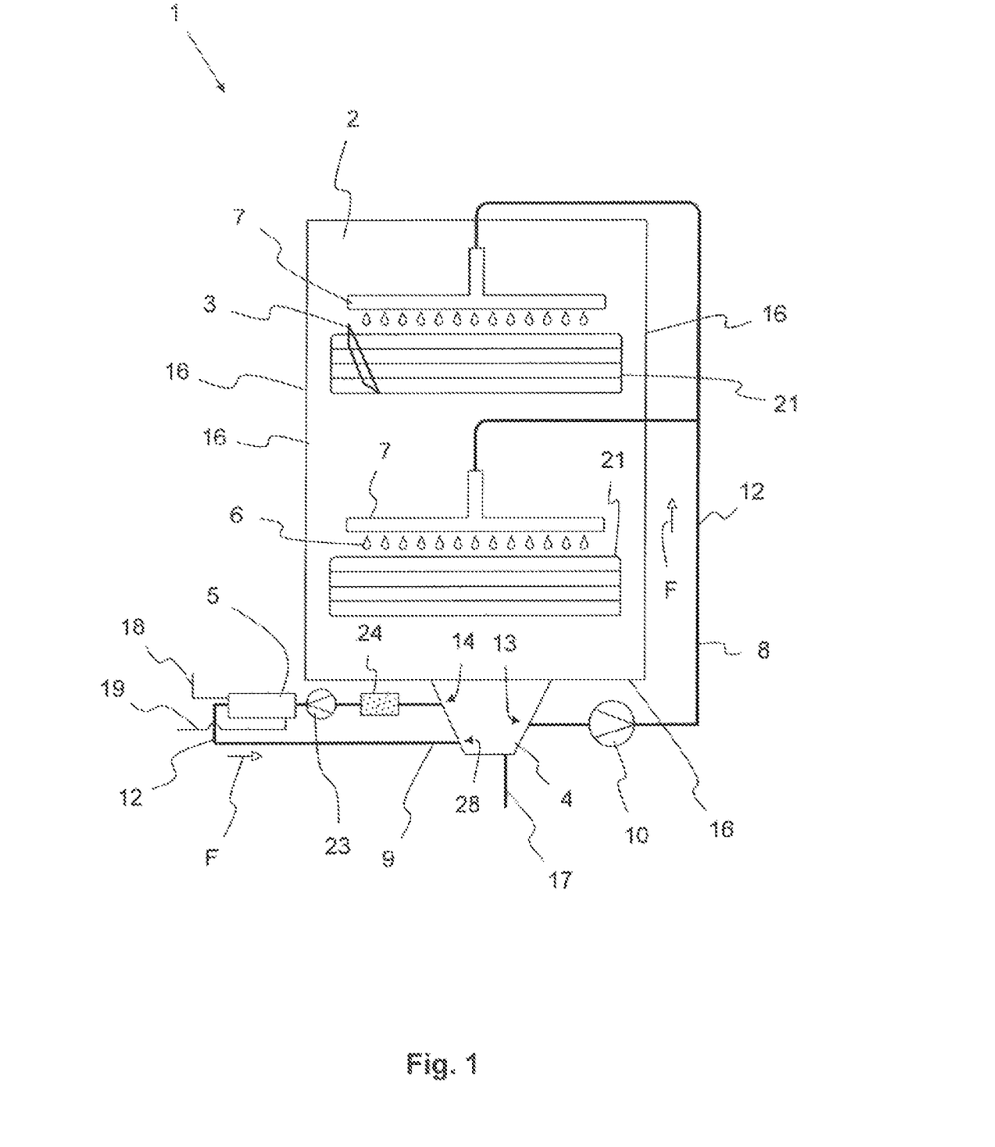
FIG. 1 shows a section of a household dishwasher according to the invention.

In the pump sump 4, the household dishwasher can have a first inlet 13 into the first flow path 8 and a second inlet 14 into the second flow path (FIG. 1). It is also conceivable that a shared inlet 29 is present (FIG. 2), via which the washing liquor 6 is initially extracted from the pump sump 4. The washing liquor 6 is finally conveyed onward via a corresponding flow divider gate (not shown) either into the first flow path 8 or into the second flow path 9 or alternatively proportionately into both flow paths 8, 9 and ultimately reaches the spray assemblies 7 and/or the plate condenser 5.

The conveying direction of the conveying device 10 and of the conveying means 23 are indicated by an arrow with the reference character F.

If, in the respective washing program to be carried out, a washing step such as a cleaning step or rinsing step is performed while the washing liquor 6 is being heated by means of the heat pump assembly, then the washing liquor 6 in the pump sump 4 is sucked by means of the conveying device 10 into the second inlet 14 of the second flow path 9 or the shared inlet 29 and transported to the plate condenser 5. There it is heated by the latter and is returned by the conveying means 23 to the pump sump 4 via the outlet 28 of the second flow path 9.

In order now to prevent foreign matter 22 present in the washing liquor 6 from adhering within the plate condenser 5 or at least to ensure that a corresponding adherence is hindered or any foreign matter 22 present is removed once again from the plate condenser 5, the household dishwasher 1 now comprises at least one means with which this object can be achieved.

FIG. 1 shows a solution in which a filter assembly 24 is integrated into the second flow path 9, through which the washing liquor 6 flows before reaching the plate condenser 5. Here the filter assembly 24 has a mesh size that traps particles up to a specified particle size.

The filter assembly 24 is preferably positioned at a location which is accessible via the receiving compartment 2 or from the outer side of the household dishwasher 1 (if necessary after removing one or several panels) so that the filter assembly 24 can be removed and cleaned easily by an operator.

In addition thereto or independently thereof, the household dishwasher 1 can have a special cleaning program, in which the flow speed of the washing liquor 6 passing through the filter assembly 24 can be increased or reversed in order to flush out of the filter assembly 24 any foreign matter 22 trapped therein and thus to clean the filter assembly 24.

The filter device 24 does not have to be integrated into the second flow path 9. Such a filter device 24 is also conceivable directly in the region of the second inlet or entry 14 or of the shared inlet or entry 29. In particular, the filter assembly 24 can alternatively already be provided at the inlet 14 of the second flow path 9.

Figure 2:
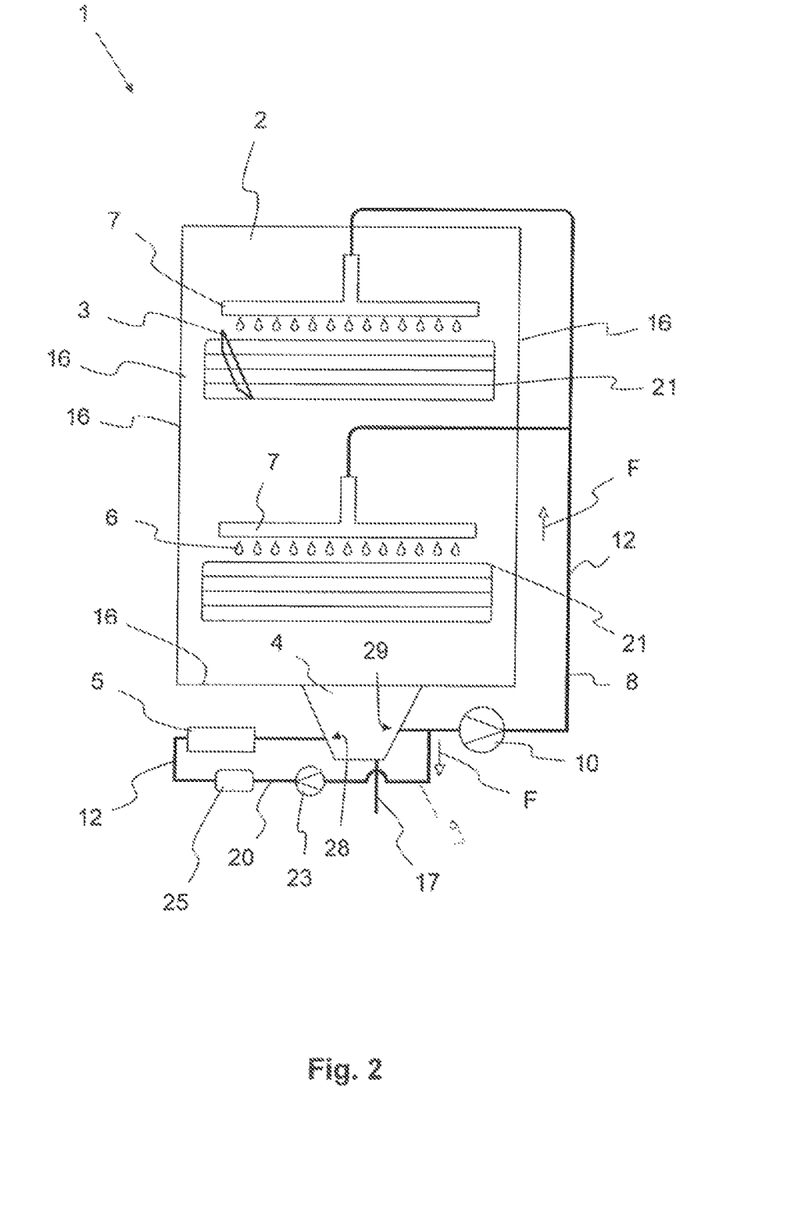
FIG. 2 shows a section of a further household dishwasher according to the invention.

FIG. 2 shows a further embodiment. Here, instead of the filter device 24 (which could of course also be present), an electrical heater 25 is provided, which heats the washing liquor 6 to a specified temperature before it enters the plate condenser 5. The heated washing liquor 6 finally causes in particular fatty deposits within the plate condenser 5 to become detached.

The electrical heater 25 is preferably activated only during selected program steps of a washing program or during a separate plate condenser cleaning program.

It can also be operated during a conventional cleaning step or a rinsing step of a washing program in order to support the heating of the washing liquor 6, which takes place mainly using the heat pump assembly.

Finally, FIG. 3 shows a partially cut section of a plate condenser 5, wherein the upper view shows a cut side view and the lower view a cut top view. The plate condenser 5 comprises, as is known from the prior art, several plates 30, which are arranged in layers with defined spacing. Each two adjacent plates arranged at a distance from one another are in contact with one another via connection regions 11 and form a cavity 31 for the washing fluid to be fed in and heated. On the side of the first and second plate delimiting the respective cavity 31 and facing away therefrom, the heat transfer medium of the heat pump assembly is preferably guided in a channel or cavity.

If washing liquor 6 is now introduced via the washing liquor inlet 26 into the plate condenser 5, it flows through the respective cavity 31. As it does so, it comes into direct contact with the surfaces 27 of the plate condenser 5 which face the washing liquor 6, so that there is always the danger here of foreign matter 22 adhering or becoming trapped in the connecting regions 11, as shown in the lower part of FIG. 3. This in turn results in a deterioration of the heat transfer through the plates 30 and thus the degree of efficiency of the plate condenser 5. After flowing through all cavities of the plate condenser, the washing fluid thereby heated leaves the plate condenser 5 once again via the washing liquor outlet 15 thereof.

Viewed from the respective cavity 31, the heat transfer medium of the heat pump assembly is guided behind the first plate 30 delimiting the cavity 31 and behind the second plate 30 arranged at a distance therefrom and delimiting the cavity, and gives off heat to the washing liquor 6, which is then pumped in the heated state into the pump sump 4 and from there to the spray assemblies 7. Finally, it reaches the items to be washed 3, where it detaches foreign matter 22 therefrom.

As FIG. 3 shows, in particular elongated items of foreign matter 22 can adhere to the connecting regions 11.

In order to detach these, it can be provided that the flow direction of the washing liquor 6 passing through the plate condenser 5 is reversed at regular intervals. As a result, adhering foreign matter 22 is detached and carried out of the plate condenser 5. This is finally shown in FIG. 4.

For this purpose, the conveying direction of the conveying means 23 is temporarily reversed, for example.

A means for preventing or reducing the clogging or even blockage of the plate condenser with foreign bodies or foreign matter can be provided in addition to or independently of the aforegoing variants in particular by the distance or width D of the gap between two adjacent walls or plates 30 of the plate condenser in each case, between which a flow channel SK for the flow-through of washing liquor to be heated is present during operation of the heat pump assembly, being selected to be at least equal to 4.5 mm. In general terms, this gap width for the flow-through of washing liquor between two adjacent plates of the condenser in each case is selected to be approximately equal to or preferably greater than the smallest occurring cross-section width of a pump, for example 23 or 10, in particular circulating pump, arranged in the flow-through channel, which cross-section still permits a sufficient passage of foreign bodies.

The same dimensioning also applies in particular to the transverse distance W between two adjacent connecting points 11 in each case, which are provided between two adjacent walls or plates 30 of the plate condenser 5 in each case in order to hold said walls together (transversely, in particular perpendicularly to the respective plate or wall plane), between which walls a flow channel SK is present for the flow-through of washing liquor to be heated during operation of the heat pump assembly.

Moreover, the present invention is not restricted to the exemplary embodiment shown. Rather, all combinations of the individual features described, as shown or described in the claims, the description and the figures, and insofar as a corresponding combination appears technically possible or expedient, are the subject matter of the invention.

LIST OF REFERENCE CHARACTERS

1. Household dishwasher
2. Receiving compartment
3. Items to be washed
4. Pump sump
5. Plate condenser
6. Washing liquor
7. Spray assembly
8. First flow path
9. Second flow path
10. Conveying device
11. Connecting regions
12. Line section
13. First inlet
14. Second inlet
15. Washing liquor outlet
16. Wall
17. Drain
18. First heat transfer medium line
19. Second heat transfer medium line
20. Washing liquor outlet
21. Rack
22. Foreign matter
23. Conveying means
24. Filter assembly
25. Electrical heater
26. Washing liquor inlet
27. Surface of the plate condenser facing the washing liquor
28. Outlet
29. Shared inlet
30. Plate
31. Cavity
F Conveying direction
S Flow direction
SK Flow channel for washing liquor to be heated
D Distance between two adjacent walls of the plate condenser, between which a flow channel for washing liquor to be heated is present
W Distance between each two adjacent connecting points 11 provided in each case between two adjacent walls of the plate condenser

The invention claimed is:

1. A household dishwasher, comprising:
a receiving compartment for receiving an item to be washed;
a pump sump;
a heat pump assembly through which, during operation, a heat transfer medium flows, said heat pump assembly comprising a plate condenser configured to enable a transfer of heat from the heat transfer medium to a washing liquor circulating in the household dishwasher;
a spray assembly configured to supply washing liquor to the item to be washed;
a first flow path extending from the pump sump to the spray assembly for conducting the washing liquor;
a second flow path extending from the pump sump to the plate condenser;
means for preventing or hindering foreign matter that is swept along with the washing liquor from adhering to a washing-liquor-facing surface of the plate condenser, the means including a filter assembly positioned within the second flow path and positioned external to and between the pump sump and the plate condenser to trap the foreign matter; and
means for removably attaching the filter assembly to the receiving compartment, the filter assembly being removable for external cleaning of the filter assembly.

2. The household dishwasher of claim 1, wherein the means for preventing or hindering foreign matter further comprises a conveying means configured to temporarily increase or lower a flow speed of the washing liquor flowing through the plate condenser or to change a flow direction of the washing liquor flowing through the plate condenser.

3. The household dishwasher of claim 2, wherein the conveying means is a pump.

4. The household dishwasher of claim 2, wherein the conveying means is configured to reverse the flow direction of the washing liquor flowing through the plate condenser.

5. The household dishwasher of claim 2, wherein the conveying means is integrated into the second flow path.

6. The household dishwasher of claim 1, wherein the means for preventing or hindering foreign matter further comprises a bypass configured to change a flow path of the washing liquor flowing into the plate condenser.

7. The household dishwasher of claim 1, wherein the means for preventing or hindering foreign matter further comprises a heating device configured to heat the washing liquor flowing into the plate condenser to a temperature of at least 60° C. before entering the plate condenser or to heat the washing liquor within the plate condenser to a temperature of at least 60° C.

8. The household dishwasher of claim 7, wherein the heating device is embodied as an electrical heater.

9. The household dishwasher of claim 7, wherein the plate condenser is constructed to form the heating device.

10. The household dishwasher of claim 1, wherein the filter assembly is provided at an inlet of the plate condenser, or configured to cover an inlet of the second flow path.

11. The household dishwasher of claim 1, wherein the filter assembly has a mesh size of between 2 mm and 8 mm.

12. The household dishwasher of claim 1, wherein the means for preventing or hindering foreign matter further comprises a gap with a distance of at least 4.5 mm between two adjacent walls of the plate condenser, between which a flow channel for flow-through of washing liquor to be heated is established during operation of the heat pump assembly.

13. The household dishwasher of claim 1, wherein the means for preventing or hindering foreign matter further comprises a gap with a distance of at least 4.5 mm between two adjacent connecting regions between two adjacent walls of the plate condenser, thereby defining a flow channel for flow-through of washing liquor to be heated during operation of the heat pump assembly.

* * * * *